United States Patent
Li et al.

(10) Patent No.: US 8,917,063 B2
(45) Date of Patent: *Dec. 23, 2014

(54) BATTERY PULSE CHARGING METHOD AND APPARATUS

(75) Inventors: Peter T. Li, Portland, OR (US); Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,861

(22) Filed: Dec. 30, 2011

(65) Prior Publication Data

US 2012/0169295 A1 Jul. 5, 2012

Related U.S. Application Data

(63) Continuation of application No. 11/765,919, filed on Jun. 20, 2007, now Pat. No. 8,138,724.

(51) Int. Cl.
*H02J 7/04* (2006.01)
*H02J 7/00* (2006.01)

(52) U.S. Cl.
CPC ............... *H02J 7/045* (2013.01); *H02J 7/0093* (2013.01); *H02J 7/0004* (2013.01)
USPC .......................................... 320/139; 320/141

(58) Field of Classification Search
USPC .......................................................... 320/139
See application file for complete search history.

(56) References Cited

U.S. PATENT DOCUMENTS

| | | | | |
|---|---|---|---|---|
| 5,684,382 | A | * 11/1997 | Fritz et al. | 320/164 |
| 5,717,937 | A | * 2/1998 | Fritz | 713/300 |
| 5,721,481 | A | 2/1998 | Narita et al. | |
| 5,726,554 | A | 3/1998 | Freiman et al. | |
| 5,739,672 | A | 4/1998 | Lane | |
| 5,889,387 | A | 3/1999 | Massie | |
| 6,025,698 | A | * 2/2000 | Kim et al. | 320/132 |
| 6,087,811 | A | 7/2000 | Crawford et al. | |
| 6,107,802 | A | * 8/2000 | Matthews et al. | 324/427 |
| 6,157,172 | A | * 12/2000 | Niemitalo et al. | 320/139 |
| 6,198,252 | B1 | * 3/2001 | Mukainakano | 320/128 |
| 6,307,352 | B1 | 10/2001 | Hooper | |
| 6,489,750 | B2 | 12/2002 | Hebding et al. | |
| 6,794,601 | B2 | 9/2004 | Norris et al. | |
| 7,301,308 | B2 | * 11/2007 | Aker et al. | 320/139 |
| 7,777,455 | B1 | * 8/2010 | Martin et al. | 320/160 |
| 8,138,724 | B2 | 3/2012 | Li et al. | |
| 2002/0033690 | A1 | 3/2002 | Karpiel et al. | |
| 2005/0189916 | A1 | 9/2005 | Bucur | |
| 2005/0234515 | A1 | * 10/2005 | Freeman | 607/3 |
| 2005/0253557 | A1 | 11/2005 | Yao | |
| 2006/0192530 | A1 | 8/2006 | Nguyen | |
| 2007/0229023 | A1 | 10/2007 | Li et al. | |

(Continued)

OTHER PUBLICATIONS

"Lineup of Models with Intel Centrino Duo Mobile Technology", Panasonic,Toughbook Catalog, 2006, pp. 1-31.

(Continued)

*Primary Examiner* — M'Baye Diao
(74) *Attorney, Agent, or Firm* — Jordan IP Law, LLC

(57) ABSTRACT

Disclosed herein are some embodiments for safely charging a mobile system battery pack, even when the power source (e.g., adapter) voltage is at a relatively high level that would otherwise result in excessive charge current.

17 Claims, 2 Drawing Sheets

(56) References Cited

U.S. PATENT DOCUMENTS

| | | | |
|---|---|---|---|
| 2007/0229024 | A1 | 10/2007 | Li et al. |
| 2007/0236171 | A1 | 10/2007 | Li et al. |
| 2008/0074080 | A1 | 3/2008 | Luo et al. |
| 2008/0122290 | A1 | 5/2008 | Li et al. |
| 2008/0315833 | A1 | 12/2008 | Li et al. |
| 2010/0153757 | A1 | 6/2010 | Li et al. |

OTHER PUBLICATIONS

"Battery Maximizer and Power Management Features Package", IBM ThinkPad, Version A 1.38, Apr. 22, 2005, 13 pages.

Texas Instruments, "bq24700, bq24701 Notebook PC Battery Charge Controller and Selector with DPM," SLUS452B, Nov. 2002, 31 pages.

Texas Instruments, "bq24702, bq24703 Multichemistry Battery Charge Controller and System Power Selector," SLUS553D, Jul. 2005, 32 pages.

Texas Instruments, "bq24721, bq24721 Advanced Multi-Chemistry and Multi-Cell Synchronous Switch-Mode Charger and System Power Selector," SLUS683C, Dec. 2006, 60 pages.

Texas Instruments, "bq24730, Advanced Multi-Chemistry and Multi-Cell Synchronous Switch-Mode Charger and System Power Selector," SLUS695, Mar. 2006, 39 pages.

Texas Instruments, "bq24740, Host-Controlled Multi-Chemistry Battery Charger with Low Input Power Detect," SLUS736, Dec. 2006, 32 pages.

Texas Instruments, "bq24750, Host-Controlled Multi-Chemistry Battery Charger with Integrated System Power Selector and AC Over-Power Protection," SLUS735, Dec. 2006, 38 pages.

Li, Peter et al., "Battery Pulse Charging Method and Apparatus", Notice of Allowance Received for U.S. Appl. No. 11/765,919, mailed Nov. 16, 2011, 9 pages.

Li, Peter T., et al., "Battery Pulse Charging Method and Apparatus", Non-Final Office Action Received for U.S. Appl. No. 11/765,919, mailed May 11, 2011, 9 pages.

Li, Peter T., et al., "Battery Pulse Charging Method and Apparatus", Non-Final Office Action Received for U.S. Appl. No. 11/765,919, mailed Oct. 28, 2010, 6 pages.

Li, Peter T., et al., "Battery Pulse Charging Method and Apparatus", Notice of Allowance Received for U.S. Appl. No. 11/765,919, mailed Jul. 19, 2010, 8 pages.

Li, Peter T., et al., "Battery Pulse Charging Method and Apparatus", Non-Final Office Action received for U.S. Appl. No. 11/765,919, mailed Jan. 6, 2010, 7 pages.

"Battery Maximiser and Power Management Features Package", IBM ThinkfPad, ,Version A 1.38, Apr. 22, 2005, 13 pages.

Texas Instruments, "bq24721, bq24721C Advanced Multi-Chemistry and Multi-Cell Synchronous Switch-Mode Charger and System Power Selector," SLUS683C, Dec. 2006, 60 Pages.

\* cited by examiner

BATTERY PULSE CHARGING METHOD AND APPARATUS

CROSS-REFERENCE TO RELATED APPLICATIONS

The present application is a continuation of U.S. patent application Ser. No. 11/765,919 filed Jun. 20, 2007.

BACKGROUND

A mobile computing system such as a so-called laptop or notebook computer has one or more battery packs, each typically comprising two or more cells, to provide the system with power when a power source (e.g., an AC adaptor) is not available. When the power source is coupled to the mobile system, it provides power to the system to operate and if there is available power left over, it will normally also charge the battery pack. For power sources to have sufficient power to perform both of these tasks, they usually generate a voltage that is higher than that of the battery pack, especially when the battery pack is fully discharged. Unfortunately, in some cases, battery packs cannot be charged if the voltage difference is high enough to result in excessive current being fed into the battery pack, which can result in over-current and/or over-heating conditions causing the charging to be terminated. Accordingly, a new approach would be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Disclosed herein are approaches for safely charging a mobile system battery pack, even when the power source (e.g., adapter) voltage is at a relatively high level that would otherwise result in excessive charge current.

Figure 1:
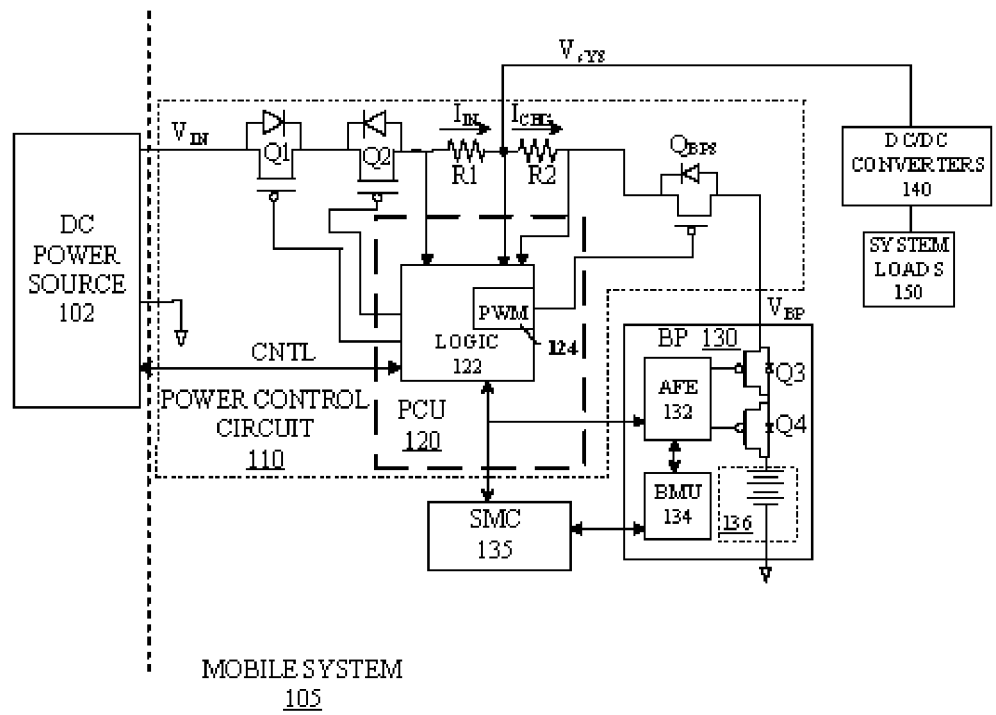
FIG. 1 is a schematic diagram of a circuit to pulse charge a battery pack in a mobile system in accordance with some embodiments.

FIG. 1 shows a power control circuit 110 for controlling a battery pack 130 and DC power source 102 to provide power to a mobile system 105. The mobile system 105 may be any type of portable computing system such as a portable computer, personal digital assistant, cellular phone, or the like. For illustrative purposes, however, it may be treated as a portable computer such as a so-called notebook or laptop computer.

The DC power source 102 may be implemented with any suitable DC power source (e.g., AC/DC adapter, fuel cell module, alternative electricity source, etc.). For example, it could be implemented with an AC/DC adaptor such as described in the concurrently filed U.S. Pat. Application to the same inventors entitled: "AC-TO-DC ADAPTER FOR MOBILE SYSTEM", incorporated by reference herein.

In the depicted embodiment, the mobile system 105 comprises the power control circuit 110, battery pack 130, system management controller (SMC) 135, one or more DC/DC converters 140, and loads 150 such as one or more processors, I/O components, network interface components, and the like. In some embodiments, for example, the power control circuit 110 may constitute an integrated circuit and/or discrete components housed on a motherboard of the mobile system 105. (It may be desirable to implement as many of the power control circuit functions, as is reasonably possible, on one or more chips so as to minimize discrete component count and cost.) It should be appreciated, however, that the power control circuit could alternatively be implemented, wholly or partially, in the DC power source 102, battery pack 130, and/or in other parts of the mobile system 105 or in some other module.

The battery pack 130 may be implemented with any suitable battery pack(s) configuration that can source an appropriate voltage ($V_{BP}$) with sufficient power for the mobile system 105. It could comprise one or more packs (e.g., selectably coupled together in parallel). Likewise, it may be conventional, as shown in the depicted embodiment, or alternatively, as with other components discussed herein, it could comprise future battery cell innovations. For example, it is believed that future cells will use different materials and/or configurations enabling them to provide lower or higher voltages with improved power and storage characteristics.

The depicted battery pack 130 comprises a plurality of series-coupled cells 136 (three in the depicted embodiment); transistor switches Q3, Q4; an analog front-end (AFE) circuit 132; and a battery management unit (BMU) circuit 134. The transistor switches Q3, Q4 are implemented with PMOS transistors, configured so that they have an associated rectification component (e.g., body diode) in the illustrated directions. They are coupled between the cells 136 and BP output terminal ($V_{BP}$) to control whether or not the collective voltage generated by cells 136 is provided to the BP output terminal. Each of the three cells, for example, could generate a voltage (when fully charged) of 4.2V, for example, so that $V_{BP}$ would be 12.6 V when the cells are fully charged.

The AFE controls transistor switches Q3 and Q4 for charging, discharging, or isolating cells 136 in response to commands from either the power control circuit 110 (via the PCU 120, discussed below), the SMC 135, or the BMU 134. The BMU monitors environmental and/or operating parameters such as temperature, charge current, and discharge current in the battery pack 130 and provides information about them to the mobile system 105 through the SMC 135. it can directly control switches Q3, Q4 through the AFE 132, for example, to shut down the battery pack when an over-temperature condition occurs. It also may provide information about the battery pack (e.g., charging and power limits) to either or both the PCU 120 and system via the SMC 135. Likewise, the PCU 120 and SMC 135 can also control switches Q3, Q4 through the AFE 132 for engaging and disengaging the battery pack in order to charge it, isolate it, or couple it to the system to provide it with power.

The power control circuit 110 generally comprises a power control unit (PCU) circuit 120, resistors: R1-R2, and transistor switches Q1, Q2, and $Q_{BPS}$, all coupled together as shown. The PCU 120 comprises logic 122 and a pulse width modulator circuit 124 to monitor current, voltage and/or power and to control the various switches in response to the monitored parameters and desired operating characteristics, discussed more below.

As with the battery pack switches Q3, Q4, the transistor switches (Q1, Q2, and $Q_{BPS}$) are implemented with P MOS transistors, configured so that rectification (e.g., body diodes) is attained as indicated. It should be appreciated, however, that any suitable component or combination of components could be used to implement these switches. For example, pass gates, NMOS transistors, or other transistor types, with or without separate diodes, could be used).

Transistors Q1 and Q2 serve to couple/decouple the system voltage node ($V_{SYS}$) to/from the DC power source voltage node ($V_{IN}$). Q1 is used to prevent the system supply ($V_{SYS}$) from being exposed when the power source 102 is removed, and Q2 is used to reject non-compliant power sources and/or for over voltage protection. Transistor switch $Q_{BPS}$ is used to controllably couple the battery pack voltage ($V_{BP}$) to, or decouple it from, the system voltage ($V_{SYS}$), as well as to/from the power source ($V_{IN}$) 102. (It should be appreciated that not all of these switches may be needed or even desired in all embodiments. On the other hand, with other embodiments, additional switches may be used or equivalent switches may be located in different places. For example, Q2 may not be used in some embodiments and additional switches may be employed in embodiments such as when additional isolation is desired or when additional battery packs are used.)

R1 and R2 serve as current sense resistors and are used by the PCU 120 to measure DC power source current ($I_{IN}$) and battery pack current ($I_{CHG}$). In this way, the PCU 120 can monitor the power being sourced by the power source 102, as well as the power being charged into the battery pack 130. (Note that notwithstanding the indicated direction of the $I_{CHG}$ current, the PCU 120 could also use R2 to monitor battery pack discharge current, e.g., when it is in the other direction and used to source power to the system.) Since the sense resistors R1, R2 are in power delivery paths, it may be desirable to make their resistances as small and accurate as is reasonably possible depending on design concerns and the like. Along these lines, it should be appreciated that other techniques for measuring power or current could be used. For example, current loop or current mirror circuits (e.g., with a relatively large transistor in the power delivery path) could be used. In fact, current mirror circuits could be configured out of the switch transistors (e.g., Q1, $Q_{BPS}$), which are in the power delivery paths anyway.

The PCU logic 122, among other things, functions to control the switches (Q1, Q2, and $Q_{BPS}$) to couple the DC source 102 to the system (Q1, Q2) and to the battery pack 130 ($Q_{BPS}$). In some embodiments, it may be coupled to a control signal (CNTL) to control the voltage and/or power provided by DC source 102, and it may use the same signal or have another signal to receive power source information such as maximum power ratings, and the like.

Figure 2:
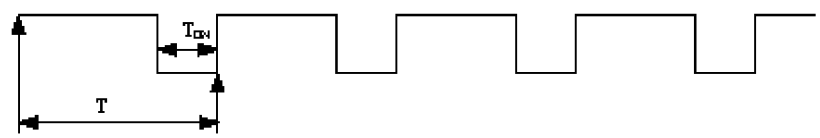
FIG. 2 is a graph showing a pulse signal for controlling pulse charging of a battery pack in accordance with some embodiments.

The pulse width modulator circuit 124 generates a pulse signal (such as that as is shown n FIG. 2) with a controllably variable duty cycle to control $Q_{BPS}$ and facilitate pulse charging of the battery pack 130. With the P-type switch $Q_{BPS}$, the pulse signal turns on the switch when Low and thus has a duty cycle of $T_{ON}/T$, where $T_{ON}$ is the portion of a cycle when $Q_{BPS}$ is turned on, and T is the period of the cycle. As the duty cycle increases, the average charge current increases, and conversely, as the duty cycle goes down, so to does the average charge current.

The PCU 120, including logic 122 and PWM circuit 124, may be implemented with any suitable combination of analog and/or digital circuits to perform various operations including those set forth herein. For example, whether or not wholly or partially integrated, it could be implemented and with combinations of particular analog and/or digital circuits, or alternatively, it could partially or wholly incorporate more generalized circuitry such as a microcontroller with available microcode. Accordingly, different operations could be performed digitally (e.g., with the use of A/D converters to digitize the incoming voltage signals, which could then be processed using digital logic), they could be performed in an analog manner, or they could be performed using both digital and analog techniques.

Figure 3:
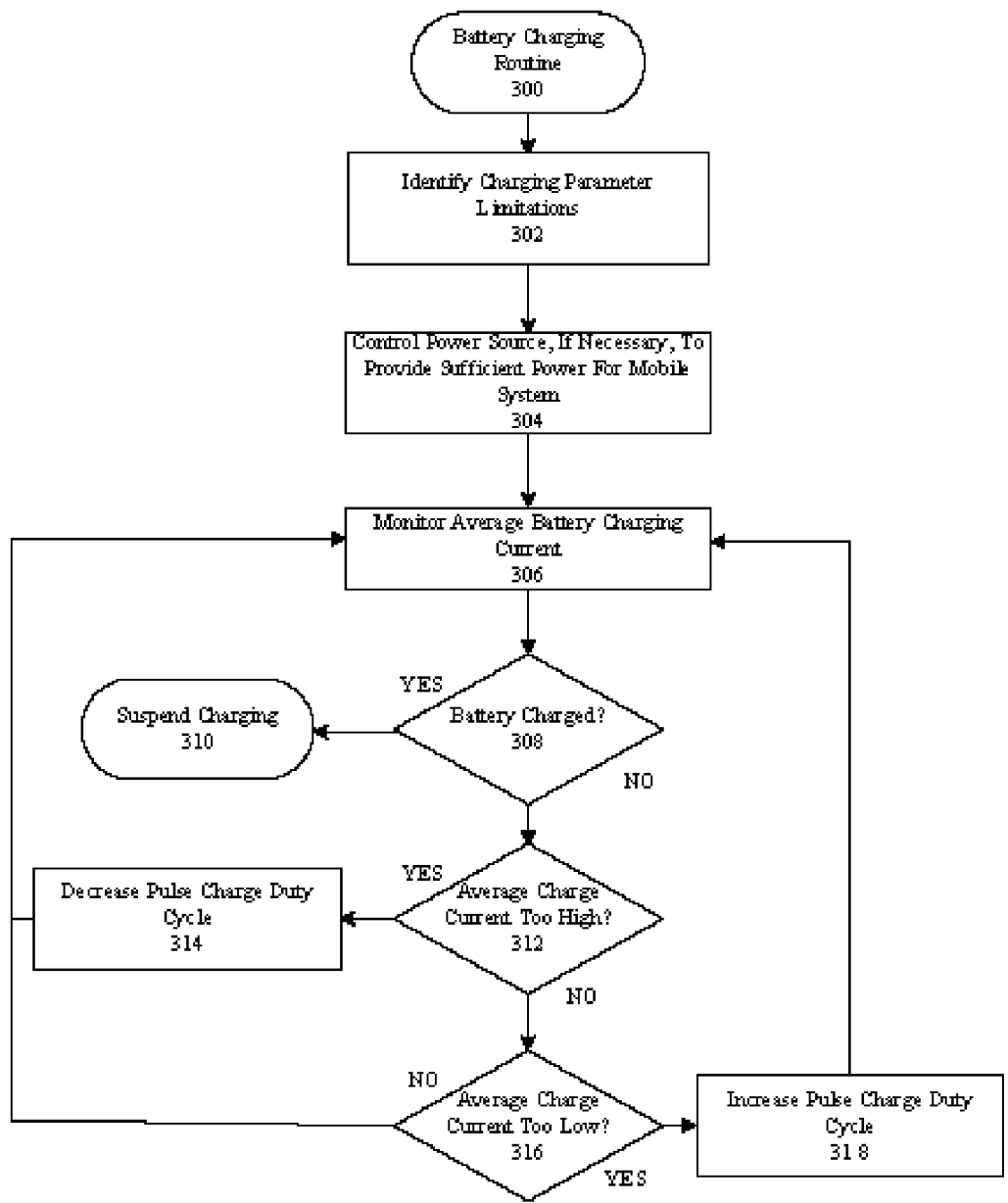
FIG. 3 is a flow diagram showing a routine for pulse charging a mobile system battery pack in accordance with some embodiments.

FIG. 3 shows a routine 300 for charging a battery pack in accordance with some embodiments. In some embodiments, this routine may be implemented, e.g., via firmware or dedicated logic, by the logic circuit 122. At 302, the logic identifies charging parameter limitations. Such limitations, for example, could include power and current limitations, for the power source and/or the battery pack. It will control the power provided to the system as well as the charging of the battery pack with these limitations in mind.

At 304, the logic controls the power source (if possible) to provide sufficient power to the system and to have additional power left for charging. (Note that in alternative embodiments, a power source with a fixed output voltage could be used, so long as the voltage is not above tolerable voltage limits for the downstream components such as the battery pack.) In some embodiments, this may involve simply setting the power source output to a maximal or "high" voltage. In other embodiments, it could involve setting it to as high of a voltage is possible, taking into account the limitations of the components that are coupled to it. (In some embodiments, the upper limit for the power source may correspond to its output voltage being at the battery pack charge termination voltage so the battery pack is not subjected to excessive charge voltages.)

From here, the routine proceeds to 306 where it monitors the average battery pack charging current. (Note that it may not calculate or determine the actual average charging current but instead may measure or determine some other correlated parameter. For example, it could simply measure average voltage potential across R2 and correlate these values, e.g., in a table, with values corresponding to current parameters, as received from the battery pack or pre-programmed in the system.) The logic could determine (measure or estimate) the average current in numerous different ways. For example, it could sample the current (via R2) at a rate sufficiently higher than the output pulse frequency to attain sufficient average current resolution. Alternatively, depending on the type of current sensor (R2 in the depicted embodiment), it could use an averaging device such as an integrating circuit or the like. On the other hand, depending on the available feedback information from the battery pack 130 (e.g., if it provides current information), a current sensor such as R2 may not even be required. Accordingly, the logic monitors average charge current, in any suitable manner, and proceeds to determination step 308.

At 308, it determines if the battery is charged. If so, then it goes to 310 and suspends charging. On the other hand, if it is determined at 308 that the battery is not yet charged, then the routine proceeds to 312 to determine whether the average charge current is too high. It may make this determination in any suitable manner. For example, it could compare a measured/calculated value against predetermined thresholds (e.g., predetermined by the logic from the battery pack 130). Alternatively, it could simply determine if the battery pack is indicating an over-current and/or over-temperature condition, if such indications are available.

From here, if it is determined that the average current is too high, then at 314, it causes the PWM to decrease the duty cycle of the pulse signal to the battery pack switch $Q_{BPS}$, and from there, it returns back to 306 and monitors average charge current, again, and proceeds as discussed. On the other hand, if it is determined that the average current is not too high, the routine proceeds to 316 and determines if the average charge current is too low. If not, then it proceeds back to 306 and continues as discussed. On the other hand, if the average charge current is too low at 316, then it proceeds to 318 and causes the PWM to increase the pulse signal duty cycle. From here, it returns to 308, continues to monitor average charge current and proceeds as discussed.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
a DC power source to have a controllable output voltage;
a circuit to controllably couple the DC power source to a battery pack of a mobile system to pulse charge the battery pack,
the circuit to control the DC power source to provide power to operate the mobile system as the battery pack is charged, and
the circuit to variably control a pulse duty cycle to charge the battery pack based on a level of the output voltage of the DC power source and information received from the battery pack, wherein the pulse duty cycle dynamically adjusts the average charge current to inhibit excessive charge current to the battery pack.

2. The apparatus of claim 1, in which the circuit includes a pulse width modulator circuit to control a switch between the DC power source and battery pack.

3. The apparatus of claim 1, wherein the circuit is to monitor a charge current going into the battery pack.

4. The apparatus of claim 1, wherein the circuit is to receive information from the battery pack to monitor the charge current.

5. The apparatus of claim 1, in which the circuit is to determine an excessive charge current level based on information received from the battery pack.

6. The apparatus of claim 1, in which the circuit is to measure a charge current using a current sensor coupled between the DC power source and battery pack.

7. The apparatus of claim 6, in which the current sensor is a resistor.

8. The apparatus of claim 1, in which the DC power source includes an AC/DC adapter.

9. A method, comprising:
powering a mobile system with a power source having a controllable output voltage;
controllably coupling the power source to a battery pack of the mobile system to pulse charge the battery pack;
controlling the power source to provide power to operate the mobile system as the battery pack is charged; and
variably controlling a pulse duty cycle to charge the battery pack based on a level of the output voltage of the power source and information received from the battery pack, wherein the pulse duty cycle dynamically adjusts the average charge current to inhibit excessive charge current to the battery pack.

10. The method of claim 9, wherein the mobile source is powered with an adapter.

11. The method of claim 9, further including monitoring a charge current going into the battery pack.

12. The method of claim 11, wherein monitoring the charge current includes receiving information from the battery pack.

13. The method of claim 9, wherein a portable computer is powered with the power source.

14. The method of claim 9, wherein controllably coupling the power source to the battery pack includes switching a transistor between the power source and the battery pack with a pulse signal.

15. The method of claim 9, further comprising determining an excessive charge current level based on information received from the battery pack.

16. The method of claim 9, further comprising measuring a charge current using a current sensor coupled between the power source and battery pack.

17. The method of claim 16, wherein the charge current is measured using a resistor.

\* \* \* \* \*